(12) United States Patent
Mummidi

(10) Patent No.: US 10,978,842 B2
(45) Date of Patent: Apr. 13, 2021

(54) CUSTOMIZABLE POWER SUPPLY

(71) Applicant: Naimisha Mummidi, Littleton, CO (US)

(72) Inventor: Naimisha Mummidi, Littleton, CO (US)

( * ) Notice: Subject to any disclaimer, the term of this patent is extended or adjusted under 35 U.S.C. 154(b) by 0 days.

(21) Appl. No.: 16/812,973

(22) Filed: Mar. 9, 2020

(65) Prior Publication Data

US 2020/0358237 A1   Nov. 12, 2020

Related U.S. Application Data

(60) Provisional application No. 62/846,090, filed on May 10, 2019.

(51) Int. Cl.
*H01R 31/06* (2006.01)
*H01R 13/66* (2006.01)

(52) U.S. Cl.
CPC ......... *H01R 31/065* (2013.01); *H01R 13/665* (2013.01)

(58) Field of Classification Search
CPC .... H01R 31/065; H01R 31/06; H01R 13/665; H01R 13/645; H01R 13/35
USPC ........................................ 439/638, 518, 173
See application file for complete search history.

(56) References Cited

U.S. PATENT DOCUMENTS

| | | | | |
|---|---|---|---|---|
| 5,613,863 | A * | 3/1997 | Klaus | H01R 27/00 439/131 |
| 6,402,546 | B1 * | 6/2002 | Groves | H01R 13/72 439/172 |
| 7,497,707 | B2 * | 3/2009 | Wu | H01R 31/06 439/172 |
| 8,469,730 | B2 * | 6/2013 | Garb | H01R 31/065 439/173 |
| 8,684,754 | B1 * | 4/2014 | Lai | H01R 13/447 439/131 |
| 10,087,572 | B2 * | 10/2018 | Bilionis | D06F 35/00 |
| 10,535,965 | B1 * | 1/2020 | Sultenfuss | H01R 24/30 |
| 10,790,628 | B2 * | 9/2020 | Landwehr | H01R 13/6205 |

* cited by examiner

*Primary Examiner* — Tho D Ta
(74) *Attorney, Agent, or Firm* — The Iwashko Law Firm, PLLC; Lev Ivan Gabriel Iwasho

(57) ABSTRACT

A customizable power supply, including an AC adapter to convert an AC current to a DC current, an AC cord section, including an AC cord, an AC connector disposed on a first end of the AC cord to removably connect to a first end of the AC adapter, and a plug-receiving inlet disposed on a second end of the AC cord, and at least one plug removably connected to the plug-receiving inlet to connect to an electrical outlet.

5 Claims, 2 Drawing Sheets

CUSTOMIZABLE POWER SUPPLY

CROSS REFERENCE TO RELATED APPLICATION

This application claims the benefit of, and incorporates by reference, U.S. provisional patent application Ser. No. 62/846,090, entitled "Customizable Power Supply," which was filed on May 10, 2019.

BACKGROUND

1. Field

The present general inventive concept relates generally to a power supply, and particularly, to a customizable power supply.

2. Description of the Related Art

Currently, people live in a rapidly growing global economy. As the world economy grows, more people need to travel to other countries to do business. Most people who travel to other countries will bring at least one type of electronic equipment on a trip, such as a laptop, a phone, and/or a tablet.

When a consumer purchases the laptop in a home country, it is not guaranteed to work when they travel to other countries. Specifically, electrical outlets are not universally designed, such that the consumer will not always be able to charge the laptop using a same electrical plug in every foreign country. Unfortunately, a universal outlet adapter is a cumbersome and is highly prone to disconnection from the electrical outlet. As such, the universal outlet adapter usually falls out of the electrical outlet when a plug is connected therein.

Therefore, there is a need for a power supply that has a removably disposed head to accommodate each of the electrical outlets based on the foreign country.

SUMMARY

The present general inventive concept provides a customizable power supply.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a customizable power supply, including an AC adapter to convert an AC current to a DC current, an AC cord section, including an AC cord, an AC connector disposed on a first end of the AC cord to removably connect to a first end of the AC adapter, and a plug-receiving inlet disposed on a second end of the AC cord, and at least one plug removably connected to the plug-receiving inlet to connect to an electrical outlet.

The at least one plug may be exchanged for another at least one plug to be inserted into another electrical outlet different from the electrical outlet.

The customizable power supply may further include a DC cord section removably connected to a second end of the AC adapter to connect to an external device.

The AC adapter may include a processing unit, a sensor connected to the processing unit to monitor the DC cord section for a voltage-feedback signal, and a circuit switch connected to the processing unit to prevent the AC adapter from sending a DC current to the DC cord section in response to the sensor detecting the voltage-feed-back signal, such that the circuit switch receives a disable command from the processing unit.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
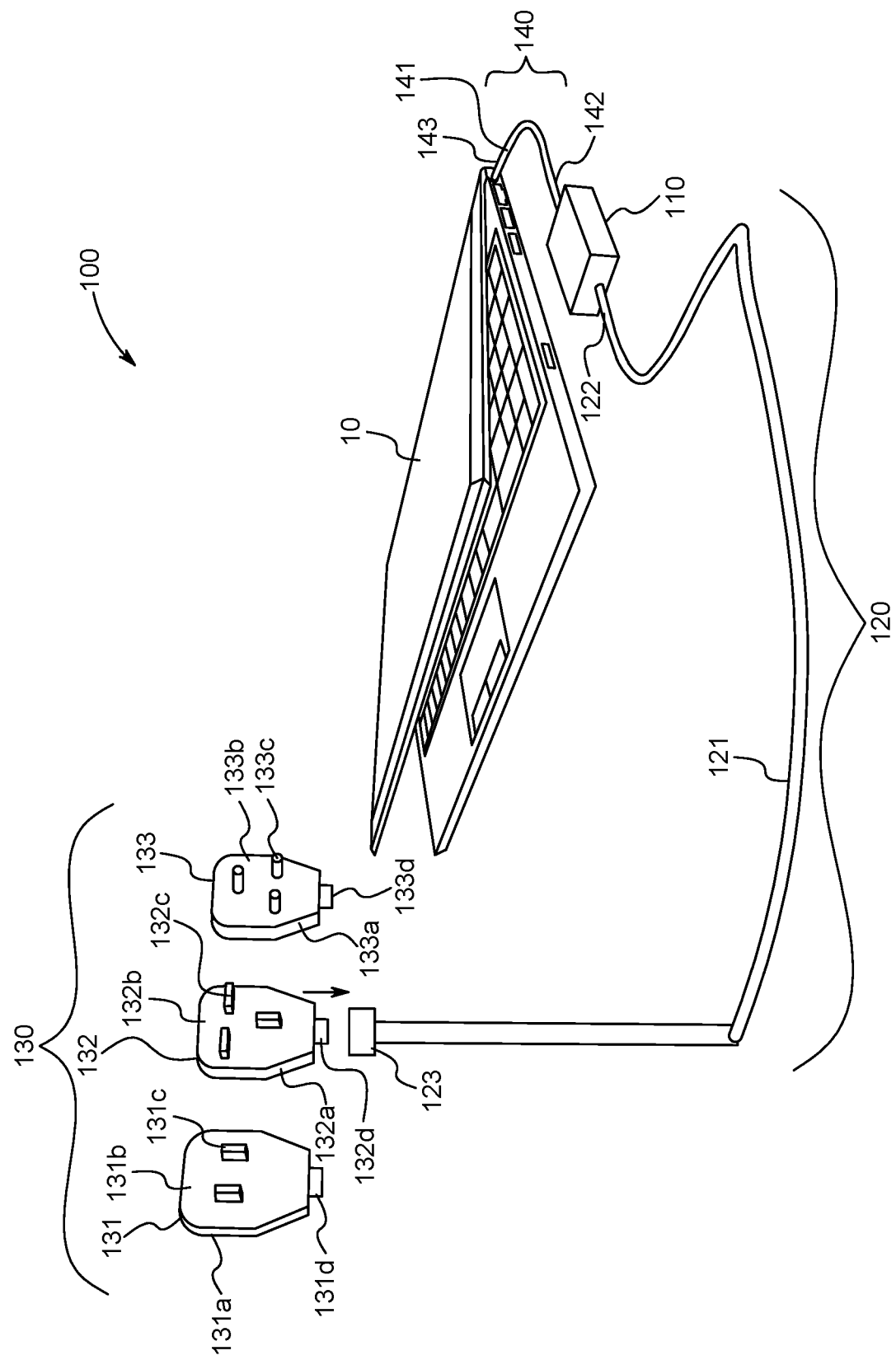
FIG. 1 illustrates a side perspective view of a customizable power supply, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Customizable Power Supply 100
AC Adapter 110
Connector-Receiving Inlet 110a
Processing Unit 111
Sensor 112
Circuit Switch 113
AC Cord Section 120
AC Cord 121
AC Connector 122
Plug-Receiving Inlet 123
Plug 130
First Plug 131
First Surface 131a
Second Surface 131b
Pin 131c
Plug-Connecting Portion 131d
Second Plug 132
First Surface 132a
Second Surface 132b
Pin 132c
Plug-Connecting Portion 132d
Third Plug 133
First Surface 133a
Second Surface 133b
Pin 133c
Plug-Connecting Portion 133d
DC Cord Section 140
DC Cord 141
DC Coupler 142
DC Connector 143

FIG. 1 illustrates a side perspective view of a customizable power supply 100, according to an exemplary embodiment of the present general inventive concept.

Figure 2:
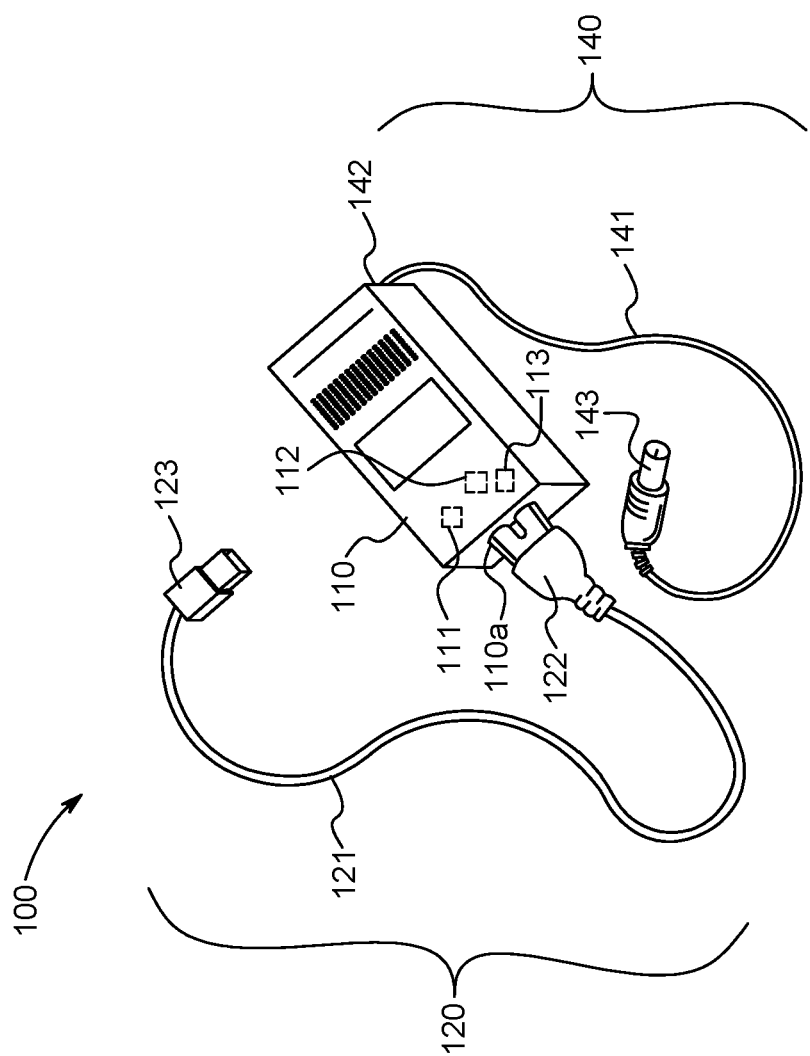
FIG. 2 illustrates a top perspective view of the customizable power supply, according to an exemplary embodiment of the present general inventive concept.

FIG. 2 illustrates a top perspective view of the customizable power supply 100, according to an exemplary embodiment of the present general inventive concept.

The customizable power supply 100 may be constructed from at least one of metal, plastic, and rubber, etc., but is not limited thereto.

The customizable power supply 100 may include an AC ("alternating current") adapter 110, an AC cord section 120, at least one plug 130, and a DC ("direct current") cord section 140, but is not limited thereto.

The AC adapter 110 may include a connector-receiving inlet 110a, a processing unit 111, a sensor 112, and a circuit switch 113, but is not limited thereto.

The connector-receiving inlet 110a may be disposed on at least a portion of a first side of the AC adapter 110. The connector-receiving inlet 110a may include a C2 inlet, a C4 inlet, a C6 inlet, a C8 inlet, a C10 inlet, a C12 inlet, a C14 inlet, a C16 inlet, a C16A inlet, a C18 inlet, a C20 inlet, a C22 inlet, and a C24 inlet, but is not limited thereto.

The processing unit 111 (or central processing unit, CPU) may include electronic circuitry to carry out instructions of a computer program by performing basic arithmetic, logical, control and input/output (I/O) operations specified by the instructions. The processing unit 111 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 111 may also include a microprocessor and a microcontroller.

The sensor 112 may include a voltage-regulation feedback sensor, but is not limited thereto.

The AC cord section 120 may include an AC cord 121, an AC connector 122, and a plug-receiving inlet 123, but is not limited thereto.

The AC cord 121 may have a predetermined length as desired by a user. The AC cord 121 may be flexible to bend in response to movement by the user and/or placement on a surface and/or an object. Moreover, the AC cord 121 may be durable and resistant to fraying.

The AC connector 122 may be disposed on a first end of the AC cord 121. The AC connector 122 may include a C1 connector, a C3 connector, a C5 connector, a C7 connector, a C9 connector, a C11 connector, a C13 connector, a C15 connector, a C15A connector, a C17 connector, a C19 connector, a C21 connector, and a C25 connector, but is not limited thereto.

The AC connector 122 may be removably connected to the connector-receiving inlet 110a of the AC adapter 110. As such, the AC connector 122 may be removed to improve portability of the customizable power supply 100.

The plug-receiving inlet 123 may be disposed on a second end of the AC cord 121.

Referring to FIG. 1, the at least one plug 130 may include at least one first plug 131, at least one second plug 132, and at least one third plug 133, but is not limited thereto.

Referring to FIG. 1, the at least one first plug 131 may include a first surface 131a, a second surface 131b, at least one pin 131c, and a plug-connecting portion 131d, but is not limited thereto.

The first surface 131a may facilitate gripping by the user. As such, the user may grip at least a portion of the first surface 131a and/or at least a portion of the second surface 131b to move the at least one first plug 131 toward the plug-receiving inlet 123, such that the plug-connecting portion 131d may be inserted into the plug-receiving inlet 123. In other words, the plug-connecting portion 131d may be removably connected to the plug-receiving inlet 123.

The at least one pin 131c may be disposed on at least a portion of the second surface 131b. Alternatively, the at least one pin 131c may be disposed on at least a portion of the first surface 131a. Moreover, the at least one pin 131c may be constructed to have any shape and/or have at least one additional pin 131c, such that the at least one first plug 131 may fit into any electrical outlet found in any location. For example, the at least one first plug 131 may be constructed to be inserted into an electrical outlet found in Asia.

Referring to FIG. 1, the at least one second plug 132 may include a first surface 132a, a second surface 132b, at least one pin 132c, and a plug-connecting portion 132d, but is not limited thereto.

The first surface 132a may facilitate gripping by the user. As such, the user may grip at least a portion of the first surface 132a and/or at least a portion of the second surface 132b to move the at least one second plug 132 toward the plug-receiving inlet 123, such that the plug-connecting portion 132d may be inserted into the plug-receiving inlet 123. In other words, the plug-connecting portion 132d may be removably connected to the plug-receiving inlet 123.

The at least one pin 132c may be disposed on at least a portion of the second surface 132b. Alternatively, the at least one pin 132c may be disposed on at least a portion of the first surface 132a. Moreover, the at least one pin 132c may be constructed to have any shape and/or have at least one additional pin 132c, such that the at least one second plug 132 may fit into any electrical outlet found in any location. For example, the at least one second plug 132 may be constructed to be inserted into an electrical outlet found in Europe.

Referring to FIG. 1, the at least one third plug 133 may include a first surface 133a, a second surface 133b, at least one pin 133c, and a plug-connecting portion 133d, but is not limited thereto.

The first surface 133a may facilitate gripping by the user. As such, the user may grip at least a portion of the first surface 133a and/or at least a portion of the second surface 133b to move the at least one third plug 133 toward the plug-receiving inlet 123, such that the plug-connecting portion 133d may be inserted into the plug-receiving inlet 123. In other words, the plug-connecting portion 133d may be removably connected to the plug-receiving inlet 123.

The at least one pin 133c may be disposed on at least a portion of the second surface 133b. Alternatively, the at least one pin 133c may be disposed on at least a portion of the first surface 133a. Moreover, the at least one pin 133c may be constructed to have any shape and/or have at least one additional pin 133c, such that the at least one third plug 133 may fit into any electrical outlet found in any location. For example, the at least one third plug 133 may be constructed to be inserted into an electrical outlet found in North America.

Therefore, the user may exchange the at least one first plug 131 for the at least one second plug 132 while visiting Europe. Alternatively, the user may exchange the at least one first plug 131 for the at least one third plug 133 while visiting North America. However, the user may have several different types of the at least on plug 130 based on a country the user is visiting. As such, the user would not need to purchase an external outlet adapter.

The DC cord section 140 may include a DC cord 141, a DC coupler 142, and at least one DC connector 143, but is not limited thereto.

The DC cord 141 may have a predetermined length as desired by the user. The AC cord 141 may be flexible to bend in response to movement by the user and/or placement on the surface and/or the object. Moreover, the DC cord 141 may be durable and resistant to fraying.

The DC coupler 142 may be disposed on a first end of the DC cord 141. Moreover, the DC coupler 142 may be disposed on a second side of the AC adapter 110.

The at least one DC connector 143 may be removably disposed on a second end of the DC cord 141. In other words, the at least one DC connector 143 may be exchanged for another at least one DC connector 143 to accommodate different types of ports on an external device, such as a laptop 10. Additionally, the at least one DC connector may be inserted into the laptop 10.

As such, the AC adapter 110 may receive an AC current from at least a portion of the AC cord section 120. The AC adapter may convert the AC current to a DC current, such that the DC current may be sent through the DC cord section 140.

The sensor 112 may monitor the DC cord section 140 for a voltage-feedback signal within the DC cord section 140. The voltage-feedback signal may be generated by the laptop 10 in response to the laptop 10 becoming fully charged. The sensor 112 may transmit a feedback alert to the processing unit 111 in response to the sensor 112 detecting the voltage-feedback signal. The processing unit 111 may transmit a disable command to the circuit switch 113 in response to receiving the feedback alert. As such, the circuit switch 113 may prevent the AC adapter 110 from sending the DC current to the DC cord section 140. As such, the AC adapter 110 may prevent the laptop 10 from overcharging.

Therefore, the customizable power supply 100 may reduce problems for the user attempting to use a universal outlet adapter. Specifically, the user may use the at least one plug 130 to insert directly in the electrical outlet without a risk of the at least one plug 130 failing out of the electrical outlet.

The present general inventive concept may include a customizable power supply 100, including an AC adapter 110 to convert an AC current to a DC current, an AC cord section 120, including an AC cord 121, an AC connector 122 disposed on a first end of the AC cord 121 to removably connect to a first end of the AC adapter 110, and a plug-receiving inlet 123 disposed on a second end of the AC cord 121, and at least one plug 130 removably connected to the plug-receiving inlet 123 to connect to an electrical outlet.

The at least one plug 130 may be exchanged for another at least one plug 130 to be inserted into another electrical outlet different from the electrical outlet.

The customizable power supply 100 may further include a DC cord section 140 removably connected to a second end of the AC adapter 110 to connect to an external device 10.

The AC adapter 110 may include a processing unit 111, a sensor 112 connected to the processing unit 111 to monitor the DC cord section 140 for a voltage-feedback signal, and a circuit switch 113 connected to the processing unit 111 to prevent the AC adapter 110 from sending a DC current to the DC cord section 140 in response to the sensor 112 detecting the voltage-feed-back signal, such that the circuit switch 113 receives a disable command from the processing unit 111.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A customizable power supply, comprising:
   an AC adapter to convert an AC current to a DC current;
   an AC cord section, comprising:
      an AC cord,
      an AC connector disposed on a first end of the AC cord to removably connect to a first end of the AC adapter, and
      a plug-receiving inlet disposed on a second end of the AC cord; and
   at least one plug removably connected to the plug-receiving inlet via a plug-connecting portion protruding away from an edge of the at least one plug in an angular direction different from at least one pin disposed on a surface of the at least one plug to connect to an electrical outlet.

2. The customizable power supply of claim 1, wherein the at least one plug is exchanged for another at least one plug to be inserted into another electrical outlet different from the electrical outlet.

3. The customizable power supply of claim 1, further comprising:
   a DC cord section removably connected to a second end of the AC adapter to connect to an external device.

4. The customizable power supply of claim 3, wherein the AC adapter comprises:
- a processing unit;
- a sensor connected to the processing unit to monitor the DC cord section for a voltage-feedback signal; and
- a circuit switch connected to the processing unit to prevent the AC adapter from sending a DC current through the circuit switch to the DC cord section in response to the sensor detecting the voltage-feed-back signal, such that the circuit switch receives a disable command from the processing unit.

5. A customizable power supply, comprising:
- an AC adapter to convert an AC current to a DC current, the AC adapter comprising:
  - a processing unit;
  - a sensor connected to the processing unit to monitor the DC cord section for a voltage-feedback signal; and
  - a circuit switch connected to the processing unit to prevent the AC adapter from sending a DC current therethrough in response to the sensor detecting the voltage-feed-back signal and receiving a disable command from the processing unit;
- an AC cord section, comprising:
  - an AC cord,
  - an AC connector disposed on a first end of the AC cord to removably connect to a first end of the AC adapter, and
  - a plug-receiving inlet disposed on a second end of the AC cord; and
- at least one plug removably connected along at least a portion of an edge thereof to the plug-receiving inlet to connect to an electrical outlet.

* * * * *